(12) United States Patent
Allen et al.

(10) Patent No.: US 6,612,346 B1
(45) Date of Patent: Sep. 2, 2003

(54) NITROGEN FLOW STABILIZER WITH TIRE PRESSURE MEASURING CAPABILITIES

(75) Inventors: Daniel Lee Allen, Lebanon, TN (US); John Martin Vasser, Murfreesboro, TN (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 10/152,525

(22) Filed: May 21, 2002

(51) Int. Cl.[7] .................................................. B65B 1/04
(52) U.S. Cl. ......................................... 141/38; 152/415
(58) Field of Search .............................. 141/38, 39–40, 141/64, 65, 66; 152/415

(56) References Cited

U.S. PATENT DOCUMENTS

| | | | |
|---|---|---|---|
| 3,498,341 A | 3/1970 | Spereberg |
| 5,967,198 A | 10/1999 | Smalley |
| 6,155,313 A | 12/2000 | Smalley |
| 6,234,217 B1 | 5/2001 | Makino et al. |
| 6,374,869 B2 | 4/2002 | Makino et al. |

*Primary Examiner*—Steven O. Douglas
(74) *Attorney, Agent, or Firm*—Michael R. Huber; Scott A. McCollister

(57) ABSTRACT

A method of inflating a tire comprising separating $N_2$ gas from air using a membrane; providing the $N_2$ gas to a storage tank having capacity for at least 40 cubic feet of $N_2$ gas at 18° Centigrade, providing the $N_2$ gas from the storage tank to a hose, the hose including a stop valve and a fitting suited to mate with a tire inflation stem; securing the fitting to a tire inflation valve, and opening a stop valve to initiate the introduction of $N_2$ gas into the tire.

16 Claims, 1 Drawing Sheet

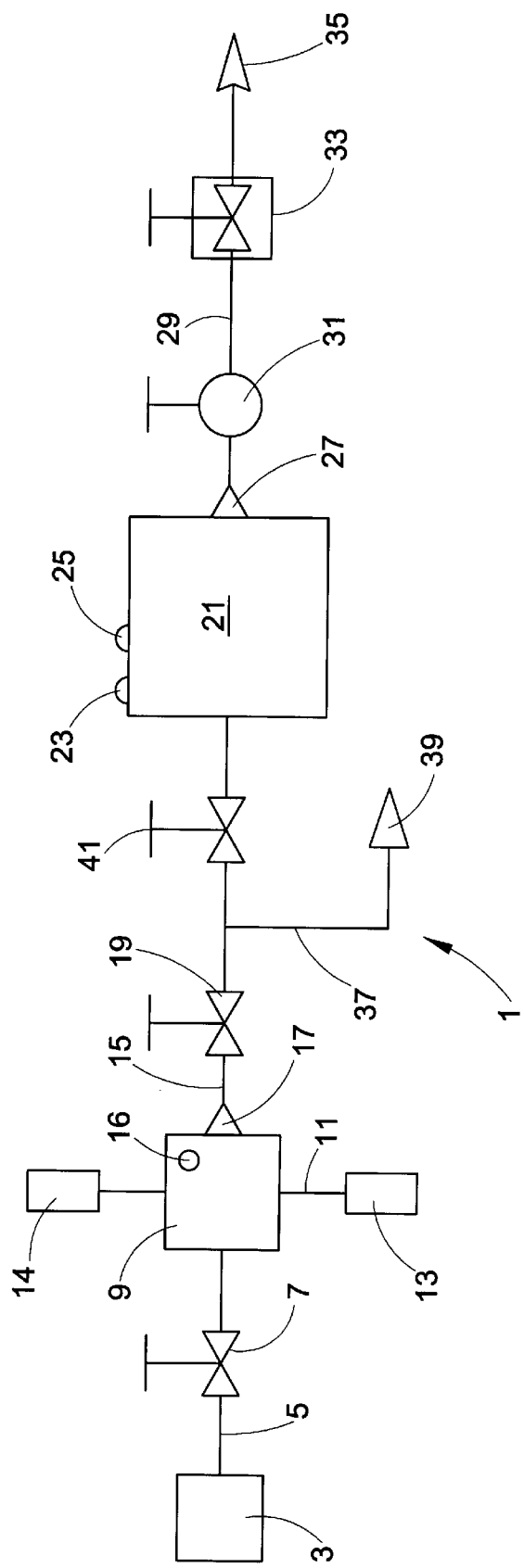

NITROGEN FLOW STABILIZER WITH TIRE PRESSURE MEASURING CAPABILITIES

BACKGROUND OF THE INVENTION

This invention is directed to a process and apparatus for filling tires with nitrogen gas ($N_2$). More particularly, this invention is directed to a process and apparatus for efficiently filling large size vehicle tires such as truck and bus tires with nitrogen gas.

When compressed air is introduced into a tire, via a compressor open to the ambient atmosphere, water vapor and other impurities are introduced into the tire. With moisture and other impurities present, the air volume in the tire, fluctuates fairly widely with temperature, particularly due to moisture changing from liquid to vapor form and vis-versa as temperatures in the tire change. As a rule of thumb, tires inflated with compressed ambient air will change about 1psi for every 10 degree Fahrenheit change in temperature. Thus, a tire inflated at 60 degrees Fahrenheit will be substantially under inflated at 20 degrees due to the combined effects of temperature in reducing gas pressure and moisture condensing out of the air within the tire. Conversely, as temperatures increase to 90 degrees Fahrenheit, the tire will be substantially overinflated due to the water being vaporized and the attendant increase in air pressure due to temperature. Those under or over inflation conditions can adversely affect rolling friction of tires on pavement, thus decreasing gas mileage. Tire wear is also increased when the tires are not inflated to the manufacturer's recommendations. Water vapor within tires may also induce rust within steel belted radials, which further reduces tire life.

In order to reduce or eliminate these problems, race cars, earthmoving and mining equipment, and commercial and military aircraft often utilize tires inflated with compressed nitrogen. Nitrogen is an ideal gas for such a purpose since it is chemically inert, non-combustible, non-flammable and non-corrosive, and when dry, is relatively stable in volume through a wide range of temperatures. For example, the specific volume of a quantity of dry nitrogen gas at 1 atmosphere of pressure varies less than 13% in a range of −10 degrees F. to +116 degrees F. Thus, the use of nitrogen to inflate a pneumatic tire offers a reduction in fluctuations of internal tire pressure due to temperature variations over those which occur when moisture laden compressed ambient air is used.

In view of the above, it is believed that filling a tire with $N_2$ gas may help the degradation of rubber and the like. Known systems of providing $N_2$ gas for tire inflation include a method wherein $N_2$ gas is separated and purified from air using industrial activated carbon, a method of using a gas separation membrane wherein $O_2$ and $N_2$ are separated from air by utilizing different permeation rates, and by simply using an $N_2$ filled canister.

SUMMARY OF THE INVENTION

While these several known systems for providing $N_2$ gas for tire inflation provide benefits, each also demonstrates certain drawbacks. For example, $N_2$ gas canister storage requires significant physical space to maintain a sufficient supply. Furthermore, transporting canisters to a filling station is both inconvenient and costly. The carbon or membrane separation apparatus can be problematic because of low $N_2$ separation rates, resulting in long filling times. In a commercial operation, extended filling times can render the process undesirable to consumers. This problem can be particularly severe when the system is used with large tire vehicles such as bus or truck. Accordingly, an improved system/process for $N_2$ tire inflation would be desirable.

According to one embodiment of the invention, a method of inflating a tire is provided. The method involves the use of an apparatus including a membrane and a storage tank and includes the steps of separating $N_2$ gas from air using the membrane and providing the $N_2$ gas to a storage tank having capacity for storing at least 40 cubic feet of $N_2$ gas at 18° centigrade. Preferably, the storage tank is separately transportable from the membrane, i.e., they are independent units. Thereafter, $N_2$ gas is provided from the storage tank to a hose, the hose including a pressure gauge, a stop valve, and a fitting suited for mating with a tire inflation valve stem. The fitting is secured to the tire inflation valve stem and the stop valve opened to initiate introduction of the $N_2$ gas into the tire. Preferably, the storage tank will include the capacity for between 50 and 600 cubic feet of $N_2$ gas at 18° centigrade. Preferably, the storage tank is able to accommodate said $N_2$ gas up to at least 100 psig, more preferably at least 200 psig. Preferably, the $N_2$ gas will be provided to the tire at a pressure of at least 110 psig.

According to another embodiment of the invention, an apparatus for inflating a tire with $N_2$ gas is provided. The apparatus includes a mechanism supplying compressed air to a membrane which separates $N_2$ and $O_2$ gas. The apparatus further includes a fluid path providing the $N_2$ gas to a storage tank having capacity for storing at least 40 cubic feet of $N_2$ gas at 18° centigrade. A hose, including a pressure gauge, a stop valve, and a fitting suited for mating with a tire inflation valve stem is provided in fluid communication with the storage tank.

BRIEF DESCRIPTION OF THE DRAWINGS

The invention will be described with reference to the accompanying drawing wherein:

FIG. 1 is a schematic illustration of an apparatus for filling $N_2$ gas according to the invention.

DETAILED DESCRIPTION OF THE PREFERRED EMBODIMENTS

The present invention provides an apparatus and process for providing $N_2$ gas to fill a tire. As recognized, tires filled with nitrogen gas provide many benefits including generally enhanced performance and longer life. These benefits may be most significant in association with high use vehicles such as trucks and buses, which can generally be categorized as large tire vehicles. The present invention provides an apparatus and process for tire inflation, particularly large tires, over a short time span thereby providing a commercially viable system of $N_2$ tire inflation. The method involves separating $N_2$ gas from air in a location proximate the tire inflation location. In this context, proximate is intended to reflect at the site of tire servicing, e.g., the service center, a vehicle manufacturing facility, an airport, etc. More preferably, proximate will mean within about 500 meters, more preferably 100 meters, of the tire(s) being inflated.

Referring now to FIG. 1, the nitrogen inflation system 1, includes air compressor 3, providing pressurized air into line 5. Air compressor 3, for large tire vehicles, preferably is capable of providing air from the atmosphere at a pressure of at least 110 psi, and more preferably, at least 140 psi. Air compressor 3 can be any available type, and preferably is provided with an internal shut off mechanism at approximately 140 psi in the event of a down stream pressure increase.

Line 5 includes stop valve 7, to facilitate opening and closing flow of pressurized air into nitrogen filter membrane module 9. Membrane module 9 may be any type known in the art useful for the separation of nitrogen from air. Examples include separation membranes formed of polyimide or activated carbon. By utilizing a difference of permeation rate produced when pressurized air is passed through such a membrane, $O_2$ gas is removed while a high concentration of $N_2$ gas is retained. $O_2$ gas can be removed via discharge line 11, including noise reduction muffler 13 at the base of $N_2$ membrane module 9. A muffler and exhaust outlet 14 is also provided for expulsion of $N_2$ system gas. Furthermore, membrane module 9 will also preferably include a nitrogen sensor 16 for monitoring the quality of gas established by the membrane.

Pressurized nitrogen gas is discharged from membrane module 9 into line 15 secured to membrane module 9 via a quick disconnect mechanism 17. Line 15 includes stop valve 19 to regulate the flow of nitrogen gas into a storage tank 21.

Storage tank 21 is preferably comprised of a high strength material capable of storing nitrogen gas up to a pressure of 150 psig, more preferably 200 psig and most preferably 250 psig. Storage tank 21 is equipped for safety purposes with a top off valve 23 set to a value commensurate to the pressure rating of the tank, e.g. 150, 200 or 250 psig. Storage tank 21 also preferably includes a pressure gauge 25 to facilitate monitoring of the system to assure readiness for prompt tire inflation.

Secured to storage tank 21 via a quick disconnect element 27, is hose 29. Hose 29 is preferably of a length which facilitates easy access to vehicle tires, particularly, bus and truck tires. Accordingly, the preferred length is at least 10 meters, more preferably, 25 meters.

Hose 29 is equipped with a pressure regulation valve 31 which facilitates introduction of nitrogen gas at the desired pressure. In addition, line 29 will include a pressure gauge with stop valve 33 to allow pressure to be monitored and the system to be closed as desired. Line 29 is completed with the inclusion of a fitting 35 suited to mate with a tire inflation valve stem.

Nitrogen inflation system 1 also includes additional hose 37, equipped with a tire inflation gauge 39 for monitoring tire pressure inflation. Although not shown, line 37 is preferably secured to line 15 via a check off valve. Stop-valve 41 allows back flow of $N_2$ gas from the tire into the nitrogen filter membrane module 9, allowing use of nitrogen sensor 16 to determine quality of $N_2$ gas tire fill.

It should be noted, that several aspects of the nitrogen inflation system 1 can be modified. For example, the entirety of the system depicted upstream of storage tank 21 can be comprised of a nitrogen-apparatus as depicted in U.S. Pat. No. 6,234,217 herein incorporated by reference. The $N_2$ flow stabilizer provided in the present invention serves as a buffer that allows for easy inflation of multiple tires with minimal difficulty.

A general method of operating the subject nitrogen inflation system 1 is to maintain storage tank 21 in a filled $N_2$ condition, i.e., up to about the maximum pressure of the apparatus. Pressure regulation valve 31 is then set to a pressure commensurate with the designated inflation pressure of a tire to be filled. Stop valve 33 is opened and fitting 35 secured to the tire inflation valve stem. Advantageously, because of the large volume high pressure nitrogen gas capacity of storage tank 21 the tires of a multiple axle vehicle such as bus or truck can be inflated rapidly. For example, the apparatus allows inflation of the tire in three to four minutes to achieve a minimum 93%, preferably 95% $N_2$ density. In contrast, the nitrogen generating apparatus depicted in U.S. Pat. No. 6,234,217 has been demonstrated to give approximately 23 minutes to inflate one tire.

Storage tank 21 can be maintained in a suitable pressurized condition via operation of air compressor 5 in conjunction with an open position of stop valves 7 and 19. It is desirable that compressor 3 provide pressurized air at a pressure sufficiently high to account for a pressure drop over the membrane 9 and still provide storage tank 21 with a pressure in accord with desired levels. A preferred storage tank provides capacity for between about 40 and 300 cubic feet of $N_2$ gas between about 100 and 200 psig and 18° C.

Examples have been performed wherein the device depicted in FIG. 1 was utilized with an air compressor generating 140 lbs. per square inch air and an 80 gallon storage tank with a 200 psig top off valve. In three tests, the results of the following table were achieved. These examples are provided to further explain the invention but are not intended to limit the scope thereof.

| Test # | Inflation Time | Tire Pressure | Air Tank Pressure | Nitrogen Density In the Tire |
|---|---|---|---|---|
| 1 | 1 min. 45 secs. | 82 psi | 109 psi | 96% |
|   | 3 min. 53 secs. | 113 psi | 117 psi | 98.14% |
| 2 | 0 | 0 | 120 psi |  |
|   | 1 min. 45 secs. | 83 psi | 106 psi | N/A |
|   | 3 min. 52 secs. | 110 psi | 116 psi | 96.8% |
| 3 | 0 | 0 | 125 psi |  |
|   | 1 min. 45 secs. | 87 psi | 106 psi |  |
|   | 2 min. 45 secs. | 103 psi | 112 psi | 96.3% |
|   | 3 min. 45 secs. | 111 psi | 116 psi | 98.4% |
| 4 | 0 | 0 | 125 psi |  |
|   | 1 min. 45 secs. | 87 psi | 106 psi |  |
|   | 2 min. 45 secs. | 104 psi | 111 psi | 96.3% |
|   | 3 min. 45 secs. | 112 psi | 115 psi | 98.1% |

Accordingly, it can be seen that the apparatus of the present invention and the method associated therewith provide a rapid mechanism for $N_2$ gas filling of large tires.

The invention has been described with reference to one exemplary figure and several exemplary embodiments. Modifications and alterations will be apparent to others upon reading and understanding the specification. The invention is intended to include such modifications and alterations insofar as they come within the scope of the appended claims.

We claim:

1. A method of inflating a tire using an apparatus including a membrane and a storage tank, said method comprising:
   a) separating $N_2$ gas from air using said membrane;
   b) providing said $N_2$ gas to said storage tank having capacity for at least 40 cubic feet of $N_2$ gas at 18° Centigrade;
   c) providing said $N_2$ gas from said storage tank to a hose, said hose including a stop valve and a fitting suited to mate with a tire inflation stem; and
   d) securing said fitting to a tire inflation valve and opening said stop valve to initiate the introduction of said $N_2$ gas into said tire.

2. The method of claim 1 wherein said hose further includes a pressure gauge.

3. The method of claim 1 wherein said hose further includes a pressure regulation valve.

4. The method of claim 1 further comprising providing $N_2$ gas from said fitting at a pressure of at least 110 psig.

5. The method of claim 1 wherein said hose has a length of at least 10 meters.

6. The method of claim 1 wherein said storage tank includes a pressure relief valve.

7. The method of claim 6 wherein said pressure relief valve opens at about 200 psig.

8. An apparatus for inflating a tire with $N_2$ gas comprising a compressed air source feeding pressurized air to a membrane which separates nitrogen and oxygen gasses, an outlet path for said nitrogen, a storage tank in fluid communication with said outlet path for storing said nitrogen, said storage tank having capacity for storing at least 40 cubic feet of $N_2$ gas at 18° centigrade, and a outlet hose in fluid communication with said storage tank, said outlet hose further including a fitting suited to mate with a tire inflation valve stem.

9. The apparatus of claim 8 wherein said hose further includes a pressure gauge.

10. The apparatus of claim 8 wherein said hose further includes a pressure regulation valve.

11. The apparatus of claim 8 wherein said hose has a length of at least 10 meters.

12. The apparatus of claim 8 wherein said storage tank includes a pressure relief valve.

13. The apparatus of claim 12 wherein said pressure relief valve opens at about 200 psig.

14. An apparatus for inflating a tire with nitrogen gas comprising a compressed air source feeding pressurized air to a device which separates a nitrogen rich gas and oxygen gasses, an outlet path for said nitrogen rich gas, a storage tank in fluid communication with said outlet path for storing said nitrogen rich gas, said storage tank having capacity for storing between 50 and 600 cubic feet of $N_2$ gas at between about 100 and 200 psig and 18° centigrade, and a outlet hose in fluid communication with said storage tank, said outlet hose further including a fitting suited to mate with a tire inflation valve stem.

15. The apparatus of claim 14 further comprising a nitrogen sensor positioned to determine $N_2$ concentration of said nitrogen rich gas.

16. The apparatus of claim 15 further comprising a nitrogen inflation monitoring hose for selectively mating to a tire and diverting nitrogen gas from said tire to said nitrogen sensor.

\* \* \* \* \*